(12) United States Patent
Schneider et al.

(10) Patent No.: US 8,696,276 B2
(45) Date of Patent: Apr. 15, 2014

(54) RIVET STUD

(71) Applicant: Newfrey LLC, Newark, DE (US)

(72) Inventors: Stefan Schneider, Giessen (DE);
Reimar Saltenberger, Giessen (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/682,854

(22) Filed: Nov. 21, 2012

(65) Prior Publication Data

US 2013/0136558 A1 May 30, 2013

(30) Foreign Application Priority Data

Nov. 25, 2011 (DE) .......................... 10 2011 055 724

(51) Int. Cl.
*F16B 13/04* (2006.01)

(52) U.S. Cl.
USPC .............................................. 411/43; 411/70

(58) Field of Classification Search
USPC ........... 411/2, 39, 43, 60.1, 70, 501, 509, 510
See application file for complete search history.

(56) References Cited

U.S. PATENT DOCUMENTS

| | | | | |
|---|---|---|---|---|
| 2,536,353 A * | 1/1951 | Cooper | ............................ | 411/70 |
| 2,803,984 A * | 8/1957 | Swenson | .......................... | 411/41 |
| 3,285,121 A * | 11/1966 | Siebol | .............................. | 411/43 |
| 3,515,419 A * | 6/1970 | Baugh | ......................... | 403/408.1 |
| 4,003,288 A * | 1/1977 | Jeal | .................................. | 411/70 |
| 4,089,249 A * | 5/1978 | Binns | ............................. | 411/510 |
| 4,376,604 A * | 3/1983 | Pratt et al. | ........................ | 411/34 |
| 4,473,914 A * | 10/1984 | Haft | ................................. | 470/11 |
| 5,018,920 A * | 5/1991 | Speakman | ....................... | 411/43 |
| 5,498,110 A * | 3/1996 | Stencel et al. | ................... | 411/43 |
| 5,503,510 A * | 4/1996 | Golan | ............................. | 411/43 |
| 5,634,751 A * | 6/1997 | Stencel et al. | ................... | 411/43 |
| 2002/0154963 A1* | 10/2002 | Jennings et al. | ................ | 411/43 |
| 2005/0013678 A1* | 1/2005 | Smith | ............................. | 411/43 |
| 2008/0219798 A1* | 9/2008 | Toosky et al. | ................... | 411/43 |
| 2009/0016842 A1* | 1/2009 | Auriol et al. | .................... | 411/43 |
| 2010/0260572 A1* | 10/2010 | Wehrmeister et al. | .......... | 411/43 |
| 2010/0329811 A1* | 12/2010 | Smith et al. | ..................... | 411/43 |

* cited by examiner

*Primary Examiner* — Roberta Delisle
(74) *Attorney, Agent, or Firm* — Michael P. Leary

(57) ABSTRACT

A rivet stud has a rivet body with an elongated shank, a flange, and an axial bore in which is located a tension mandrel, which has a mandrel shank with a drawing end projecting out of a head end of the rivet body that is separable from the mandrel shank at a predetermined breaking point and which has a mandrel head that is supported on a foot end of the rivet body. The mandrel shank is provided with locking means that secure it in the rivet body after setting of the rivet stud, and the predetermined breaking point is located such that the breaking point lies inside the bore of the rivet body after setting of the rivet stud. Located on the mandrel head is a mounting stud that projects from the mandrel head on the side opposite the mandrel shank.

14 Claims, 2 Drawing Sheets

RIVET STUD

CROSS-REFERENCE TO RELATED APPLICATIONS

This application claims priority from German Patent Application No. DE 102011055724.5, filed on Nov. 25, 2011, the disclosure of which is incorporated herein by reference.

BACKGROUND OF THE INVENTION

The invention concerns a rivet stud, having a rivet body that has an elongated shank with a head end, a foot end, and an axial bore, wherein the shank is intended to be inserted foot end first into an opening in a workpiece and a radially extending flange that serves to make contact with one side of the workpiece is located at the head end, and said rivet stud having, located in the bore of the rivet body, a tension mandrel, which has a mandrel shank with a drawing end projecting out of the head end of the rivet body that is separable from the mandrel shank at a predetermined breaking point, and which mandrel has a mandrel head that is supported by the foot end of the rivet body in order to transmit a force to the rivet body during setting of the rivet stud.

A rivet stud of the specified type is known from DE 3,610,976 A1. In this prior art rivet stud, the drawing end is separated from the mandrel shank by a predetermined breaking point that is located at such a distance from the flange of the rivet body that there remains, between the flange and the predetermined breaking point, a region designed as a profile stud, wherein the tension mandrel remaining in the rivet body after the setting process supports the profile stud so as to project away from the flange. In this design, the predetermined breaking point that is broken after the setting process forms a sharp-edged end of the profile stud that can lead to damage of parts to be installed on the profile stud and can result in injuries during handling and installation.

A blind rivet is known from WO 2009/09843 A1 that is intended to permanently join workpieces that are in contact with one another. The workpieces typically have holes passing through them that are brought into alignment with one another and into which the blind rivet is placed and then fastened by deformation. A fastened blind rivet usually results in a clearance-free seating of the rivet body in the holes of the workpieces and clamps the workpieces together.

BRIEF SUMMARY

The object of the invention is to create a rivet stud of the specified type that avoids the risk of damage to the component and the risk of injury during installation and handling.

The object is attained according to the invention by a rivet stud with the features specified in claim 1.

According to the invention, the rivet stud comprises a rivet body that has an elongated shank with a head end, a foot end, and an axial bore, wherein the shank is intended to be inserted foot end first into an opening in a workpiece and a radially extending flange that serves to make contact with one side of the workpiece is located at the head end, and comprises a tension mandrel located in the bore of the rivet body, which mandrel has a mandrel shank with a drawing end projecting out of the head end of the rivet body that is separable at a predetermined breaking point from the mandrel shank, and which has a mandrel head that is supported by the foot end of the rivet body in order to transmit a force to the rivet body during setting of the rivet stud, wherein the mandrel shank is provided with locking means that secure the mandrel shank in the rivet body after setting of the rivet stud, wherein a mounting stud that projects from the mandrel head on the side opposite the mandrel shank is located on the mandrel head, and wherein the predetermined breaking point is located such that the breaking point lies inside the bore of the shank after setting of the rivet stud.

In the rivet stud according to the invention, the mandrel head is elongated on the side opposite the mandrel shank to form a mounting stud that, in cooperation with suitable fastening elements such as a nut, a clip, or the like, can serve to fasten components. To this end, the mounting stud can have a cylindrical shape with fastening means including a surface that is smooth, ribbed, or provided with an external thread, or can also be provided with a differently designed fastening end, for example in the manner of a T-stud with a flange. Preferably the tension mandrel and mounting stud are produced as a single piece. However, it is also possible to join the tension mandrel by welding to a separately manufactured mounting stud. If the mounting stud is provided with an external thread, then it is advantageous according to the invention for there to be means for transmitting a torque between the tension mandrel and the rivet body, for example projections or longitudinal ribs. Preferably, the locking means that secure the part of the tension mandrel that is separated from the drawing end in the rivet body after setting can additionally be designed to transmit a torque.

The rivet stud, and in particular the rivet body, is designed according to the invention in such a manner that, during the setting process, the rivet body forms a disk on the blind side of the penetrated workpiece that rests uniformly against the workpiece. The formation of the disk supports an orientation of the rivet stud perpendicular to the surface of the workpiece, since the axial clamping force acting between the mandrel head and the flange during setting generates a moment of force that tends to move the rivet stud into a perpendicular position. The disk formed by the rivet body also increases resistance to loads on the set rivet mandrel that are oriented perpendicular to the longitudinal axis of the rivet body. During the setting process, the disk formed by the bulging of the rivet body moves axially against the workpiece, wherein the radial expansion of the rivet body is reduced within the opening of the workpiece. As a result, the rivet stud is also suitable for placement in thin and soft workpieces. The disk-shaped bulging of the rivet body also reduces the tendency of the rivet body to pull into the opening of the workpiece during setting.

A variety of materials may be used to manufacture the rivet stud according to the invention. All parts may be made of steel or stainless steel, of aluminum, or of plastic. Moreover, combinations of materials in which the tension mandrel is made of steel, stainless steel, or plastic and the rivet body is made of aluminum or plastic are advantageous. Thus, the rivet stud can be implemented in a corrosion-resistant material such as stainless steel or plastic.

The rivet stud according to the invention presents advantages and application possibilities. The anchoring of the rivet stud in one or more workpieces ensures high resistance to pull-out, since the rivet stud is supported on the workpiece by its flange, which can be made to have large dimensions, particularly when the mounting stud is under tensile loading. Due to the interlocking connection of the tension mandrel and rivet body, and the contact pressure of the disk-shaped setting head, the anchoring of the rivet stud in the workpiece can withstand high dynamic loads. The connection between the rivet stud and workpiece is impervious to splash water.

Setting of the rivet stud according to the invention can be carried out easily and quickly, and only requires one side of the workpiece to be accessible. Setting of the rivet stud can be performed fully automatically using existing blind rivet installation tools, but can also be done with simple hand-operated tools, and its use requires little training. The rivet stud can be set in soft materials in which it is not possible to use other methods, such as stud welding, adhesive stud bonding, self-piercing riveting, press fit studs, etc. The rivet stud can be set in a single workpiece or can join multiple workpieces together by setting. As a result, it is suitable for joining multilayered components without limitation with regard to the arrangement of the individual layers, their materials, or their thicknesses. The rivet stud can be set in even the thinnest-walled materials, such as films of 0.1 mm. On the other hand, it can have a wide clamping range, for example in material thicknesses from 1.5 to 5 mm for a rivet body diameter of 4.8 mm. Consequently, multiple components can be joined, and the requirement for different versions of rivet studs is low as a result. The rivet stud does not place any special requirements on the surface finish of the workpiece, and does not damage existing anti-corrosion coatings on the workpiece.

BRIEF DESCRIPTION OF THE SEVERAL VIEWS OF THE DRAWING

The invention is explained in detail below with reference to an exemplary embodiment that is shown in the drawings. They show.

DETAILED DESCRIPTION OF THE PREFERRED EMBODIMENTS

Figure 1:
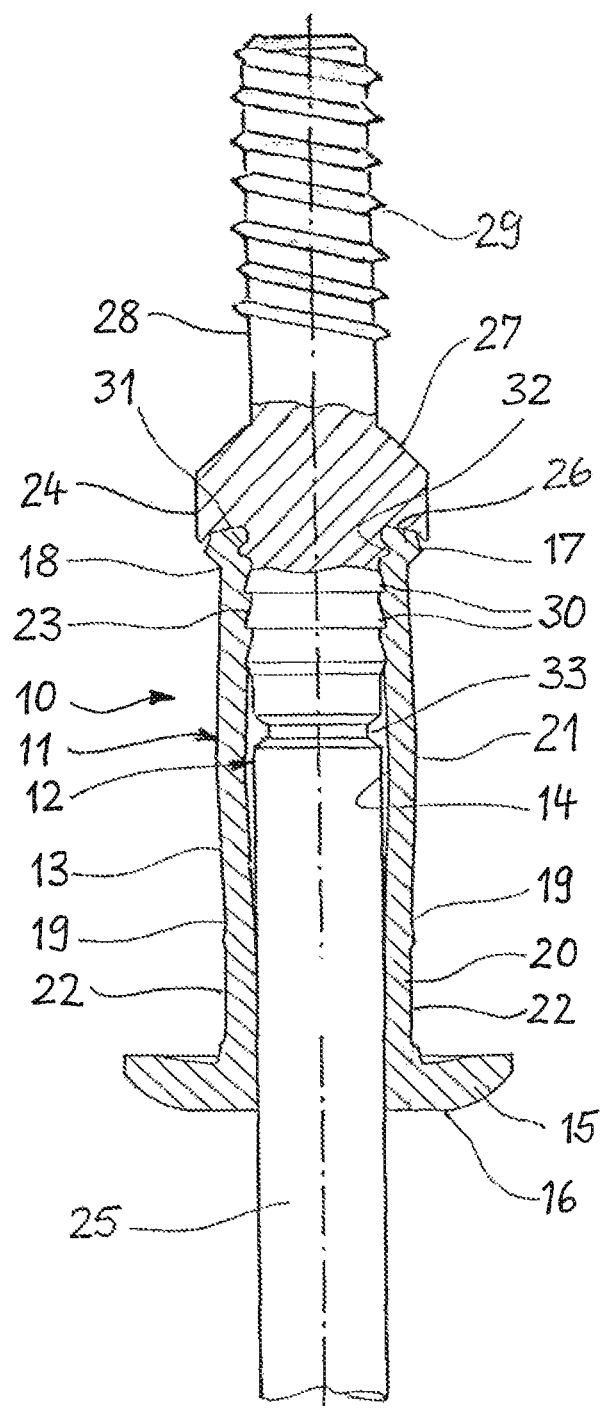
FIG. 1 a cross-section of a rivet stud according to the invention.

FIG. 1 shows a rivet stud 10, which is composed a rivet body 11 made of aluminum or steel, and a tension mandrel 12 made of steel. The rivet body 11 is mounted on the tension mandrel 12 and has an elongated shank 13 with a through-bore 14, in which the tension mandrel 12 is located. Formed at a head end of the shank 13 is a flange 15, which takes the form of an annular disk and is intended to contact a workpiece. The side of the flange 15 facing away from the shank 13 is provided with a flat support surface 16 for supporting the forward end of a riveting tool.

At its end opposite the flange 15, the shank 13 forms a foot end 17, which is set off from the shank 13 by a first constriction 18. A second constriction 19 divides the shank 13 into an essentially cylindrical first section 20 and a barrel-shaped second section 21 that curves slightly outward. On its outside, the first section 20 is provided with multiple flat indentations 22 spaced at regular intervals from one another that extend in the axial direction over nearly the entire length of the first section 20. As a result of the indentations 22 produced by way of cold forming, the strength of the shank 13 in the region of the first section 20 is increased with the result that the first section 20 is no longer expanded or is only slightly expanded during setting of the rivet stud 10. In the region of the first section 20 and in the region of the foot end 17, the rivet body 11 is in contact with the tension mandrel 12; in the central region that curves outward, an annular clearance is present between the rivet body 11 and the tension mandrel 12.

The tension mandrel 12 has a mandrel shank 23 that bears a mandrel head 24 at one end, and an elongated drawing end 25 at the other end. The mandrel head 24 has a greater diameter than the mandrel shank 23, and has, on the underside facing the mandrel shank 23, flat contact surfaces 26 for the foot end 17 of the shank 13. The contact surfaces 26 are inclined at an acute angle of approximately 70° to 80° with respect to the longitudinal axis of the tension mandrel 12. In place of the flat contact surfaces 26, a concave conical surface with corresponding inclination may also be provided. The end of the mandrel head 24 opposite the contact surfaces 26 has a conical shoulder 27, which is adjoined by a mounting stud 28 coaxial to the mandrel shank 23. The mounting stud 28 has an external thread 29, but can also be smooth or provided with a T-head. If the mounting stud (28) is provided with an external thread (29) or other fastening means subject to a torque force when a nut or other device is secured to the stud (28), then it is advantageous according to the invention for there to be means for transmitting a torque between the tension mandrel and the rivet body, for example projections or longitudinal ribs (not shown).

On part of its length, the mandrel shank 23 has locking means in the form of annular ribs 30, which are spaced apart from one another and have a sawtooth-like cross-section that is composed of conical surfaces and radial surfaces. The conical surfaces of the ribs 30 face the mandrel head 24. Located between the mandrel head 24 and the rib 30 adjacent thereto is an annular rib 31, which is embedded in a groove 32 in the foot end 17 and holds the tension mandrel 12 in place in the rivet body 11 against the recoil that attempts to drive the tension mandrel 12 out of the rivet body 11 when the drawing end 25 pulls off during setting of the rivet stud 10. The rib 31 also ensures an effective seal between the rivet body 11 and the tension mandrel 12 after the rivet stud 10 has been set. The bore 14 is adapted to the outside contour of the ribs 30, 31 by radial deformation of the rivet body 11, forming an interlocking connection between the mandrel shank 23 and the shank 13. As a result of the interlocking connection, the tension mandrel 12 is held fast in the bore 14 of the shank 13 by the ribs 30, 31, so that the rivet body 11 and the tension mandrel 12 compose an easy-to-manipulate structural unit. During setting of the rivet stud 10, the ribs 30, 31 contribute to the transmission of tensile forces to the rivet body 11, and after setting, they secure the tension mandrel 12 in the rivet body 11 that is joined to the workpiece. Preferably, the locking means that secure the part of the tension mandrel that is separated from the drawing end in the rivet body after setting can additionally be designed to transmit a torque from the mounting stud (28) into the rivet body (11).

The drawing end 25 is connected to the mandrel shank 23 by means of a constricted parting section that forms a predetermined breaking point 33. The pre-determined breaking point 33 is located in the bore 14 of the rivet body 11 and has a spacing from the flange 15 such that the breaking point on the mandrel shank 23 is located in the bore 14 even after setting of the rivet stud 10.

Figure 2:
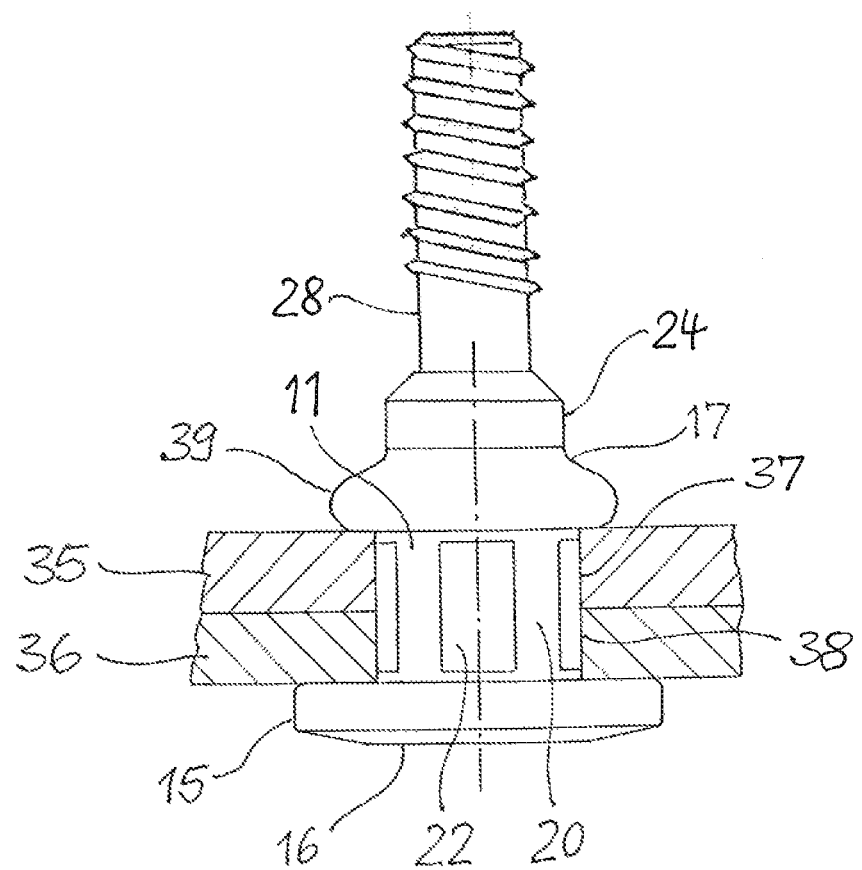
FIG. 2 a partial section of a fastening arrangement according to the invention.

FIG. 2 shows a fastening arrangement with two workpiece components 35, 36 joined by a rivet stud 10. The components 35, 36 have bores 37, 38. For the purpose of joining the components 35, 36, the rivet stud 10 is inserted in the aligned bores 37, 38 of the components 35, 36. With the aid of a setting tool that bears on the support surface 16 of the rivet stud 10, a tensile force is then exerted on the drawing end 25 of the tension mandrel 12, and the rivet body 11 is deformed, causing the foot end 17 to approach the flange 15. During this process, the barrel-like second section 21 on the blind side of the components 35, 36 folds to form a disk-shaped flange 39 that lies flat against the component 35 and presses the components 35, 36 against one another and against the flange 15. Consequently, components made of plastic do not require any reinforcement by additional components or intermediate layers made of metal, since the flange 39 rests virtually flat against the component 35. The component 35 experiences only a reduced radial load, because the flange 39 forms as a disk shape rather than as a cone shape. The cylindrical first section 20 is located in the bores 37, 38 and is loaded in compression by the tensile force that is exerted. The increased strength of the section 20 that has been produced by the indentations 22 prevents or reduces a radial expansion in the section 20, however, so that no radial pressure, or at most a slight radial pressure, takes place between the section 20 and the walls of the bores 37, 38. As a result, the stress on the components 35, 36 in the radial direction is low, and the risk of overloading or damaging the components during setting of the rivet stud is avoided. Only in the blind-side end region of the bore 37 in the component 35 may a limited radial pressure resulting from radial expansion of the shank 13 be desirable in order to achieve a better seal between the rivet body 11 and component 35.

The region of the foot end 17 of the rivet body 11 is compression set during the setting process, and thereby pressed more firmly against the teeth formed by the ribs 30, 31. In this way, the interlocking anchoring of the mandrel shank 23 in the rivet body 11 is reinforced and a tension-resistant connection is created between the two parts, so that the mounting stud 28 can transfer high pull-off forces to the components 35, 36 and does not come loose even under dynamic loading. In the case of a rivet stud 10 with a rivet body diameter of 4.8 mm, the mounting stud 28 withstood pull-off forces of more than 800 N in the axial direction.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A rivet stud for joining a first workpiece and a second workpiece when the rivet is set, the rivet stud comprising:
   a tubular rivet body defining a longitudinal axis and including an elongated shank, with a head end and a foot end and an axial bore, and a radially outward extending flange located at the head end;
   a tension mandrel located coaxially in the bore of the rivet body and including a mandrel head located proximate the foot end of the rivet body and a mandrel shank with a drawing end projecting out of the head end of the rivet body, the drawing end separable from the mandrel shank at a predetermined breaking point, and the mandrel shank includes locking means that secure the mandrel shank in the rivet body after setting of the rivet stud; and
   a mounting stud projecting axially from the mandrel head on a side opposite the mandrel shank.

2. A rivet stud according to claim 1 wherein the predetermined breaking point is located such that the breaking point lies inside the bore of the rivet body after setting of the rivet stud.

3. A rivet stud according to claim 1, wherein the locking means are located in the vicinity of the mandrel head.

4. A rivet stud according to claim 1, wherein the locking means includes an annular rib that projects radially outward from a circumferential surface of the mandrel shank.

5. A rivet stud according to claim 1 and further comprising means for transmitting a torque between the mandrel and the rivet body after setting.

6. A rivet stud according to claim 1 wherein the mandrel includes longitudinal ribs located axially below the head for transmitting a torque between the mandrel and the rivet body after setting.

7. A rivet stud according to claim 1 wherein the mounting stud includes one of an annular rib and an external thread.

8. A rivet stud according to claim 1, wherein the mounting stud includes a radially outward extending flange located distal from the mandrel head.

9. A rivet stud according to claim 1, wherein the shank of the rivet body includes: a first axial section proximate to the flange, and a second axial section proximate to the foot end, and the strength of the first section of the shank is greater than the strength of the second section.

10. A rivet stud according to claim 1, wherein the shank of the rivet body includes a second axial section proximate to the foot end, and the strength of the foot end of the shank is greater than the strength of the second section.

11. A rivet stud according to claim 1, wherein the shank of the rivet body includes a first axial section proximate to the flange, and a second axial section proximate to the foot end, and the second section of the shank bows radially outward into a barrel-like shape.

12. A rivet stud according to claim 1, wherein the mandrel head includes a contact surface touching an end face of the foot end of the rivet body.

13. A rivet stud according to claim 12, wherein the contact surface is part of a concave conical surface facing axially toward the foot end of the rivet body, and the conical surface defines a radially extending generating line that together with the longitudinal axis of the rivet body defines an angle of substantially 80°.

14. A rivet stud according to claim 1 wherein the mounting stud defines a stud diameter and the mandrel head defines a head diameter greater than the stud diameter, and the head includes a shoulder adjoining and extending radially outward from the mounting stud.

* * * * *